US005142669A

United States Patent [19]

Inoue et al.

[11] Patent Number: 5,142,669

[45] Date of Patent: Aug. 25, 1992

[54] TEXT PROCESSING APPARATUS INCLUDING FIXED AND SCROLLED DISPLAY INFORMATION

[75] Inventors: Katumi Inoue, Higashiosaka; Ayumi Sakae, Matsudo, both of Japan

[73] Assignee: Sharp Kabushiki Kaisha, Osaka, Japan

[21] Appl. No.: 225,890

[22] Filed: Jul. 29, 1988

[30] Foreign Application Priority Data

Jul. 31, 1987 [JP] Japan .............................. 62-193145

[51] Int. Cl.[5] .............................................. G06F 3/14

[52] U.S. Cl. .................................................... 395/157

[58] Field of Search ................ 364/521, 518; 340/724, 340/726; 395/155, 157, 144

[56] References Cited

U.S. PATENT DOCUMENTS

| | | | |
|---|---|---|---|
| 4,328,557 | 5/1982 | Gastinel | 364/900 |
| 4,412,294 | 10/1983 | Watts et al. | 364/518 |
| 4,611,202 | 9/1986 | DiNitto et al. | 340/724 |
| 4,710,761 | 12/1987 | Kapur et al. | 340/724 X |
| 4,714,918 | 12/1987 | Barker et al. | 340/724 |
| 4,794,386 | 12/1988 | Bedrij et al. | 340/724 |

FOREIGN PATENT DOCUMENTS 4990459 12/1972 Japan .

OTHER PUBLICATIONS

*Turbo Prolog Owner's Handbook*, Bordland International, Inc., 1986, pp. 15, 169–170.

*Primary Examiner*—Gary V. Harkcom
*Assistant Examiner*—Michael A. Jaffe

[57] ABSTRACT

A text processing apparatus includes a keyboard to input various kinds of text information and includes a display to display text information input from the keyboard and an area specifying device to specify an area of the text information displayed on the display device. A scroll instruction device is included to scroll the text information displayed on the display device, memories to store information for use in editing text information input from the keyboard, and a dispaly controller. Reference material can be input into a window on the display. When a scroll command is given, the window containing the reference material will scroll to an edge of the display and will stop. Text displayed outside the window can continue to scroll while the text in the window remains fixed.

5 Claims, 5 Drawing Sheets

TEXT PROCESSING APPARATUS INCLUDING FIXED AND SCROLLED DISPLAY INFORMATION

BACKGROUND OF THE INVENTION

The present invention relates to a text processing apparatus for example a word processor which processes text information and produces documents. In particular, the invention relates to a scroll display control to display information in scroll form in the apparatus.

In displaying text information in scroll on a screen of a text processing apparatus, the screen is scrolled continuously. As a result, text information which should be preferably kept on the screen for reference is also scrolled. Therefore, to see the reference text, it is necessary to stop inputting texts, redisplay the portion on the screen that contains the reference text, and scroll it again to a position for inputting texts after the reference.

Recently, as disclosed in the Japanese Patent Laid-Open Publication No. 49-90459 "Display Control System", a system has been proposed which provides a dynamic area and a static area on the screen for scroll display. Information to be displayed fixedly that is in a fixed format, on the screen is input in advance in this static area. However, the position of this static area, once set, cannot be changed. There are problems with the above-mentioned system. For example, information to be referred to must be input and displayed in advance in a specific area, for example, the above mentioned static area. Also that the specific area initially set on the screen is always occupied by the above mentioned display in the static area. Specifically, the static area is fixed in a specific area on the screen.

SUMMARY OF THE INVENTION

To overcome the above problems, an object of the present invention is to provide a text processing apparatus which has a display of text information or the like on the screen which is more usable than known before.

Another object of the present invention is to provide a text processing apparatus in which a specific area is designated on the screen so that data displayed in the specific area can be moved on the display screen.

A further object of the present invention is to provide a text processing apparatus in which by specifying the display area of reference information in inputting the reference information, the reference information is displayed in a fixed format in the specified area when the specified area has reached an end (upper, lower, left or right end) of the screen.

Other objects and further scope of applicability of the present invention will become apparent from the detailed description given hereinafter. It should be understood however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to a preferred embodiment of the present invention, a text processing apparatus includes input means to input various kinds of text information. The apparatus has display means to display text information or the like, which has been input with the input means. Also included area specifying means to specify an area of the text information, or the like, displayed on the display means. scroll instruction means to scroll display the text information or the like, displayed on the display means, an edit memory to store information for editting text information input with the input means. There is a display control means which, if a particular area has been specified when the scroll display is instructed, permits the specified area to be displayed fixedly when the specified area reaches the upper, lower, right or left end of the screen.

In the present invention, the text processing apparatus specifies the display area of information if there is any information to be referred to for the subsequent text processing so that, in scroll display, when the specified display area has reached the upper, lower, right or left end of the screen, it displays the reference information fixedly and constantly on the screen.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE EMBODIMENT

An embodiment of the text processing apparatus of the present invention is described below referring to FIGS. 1 through 5.

Figure 1:
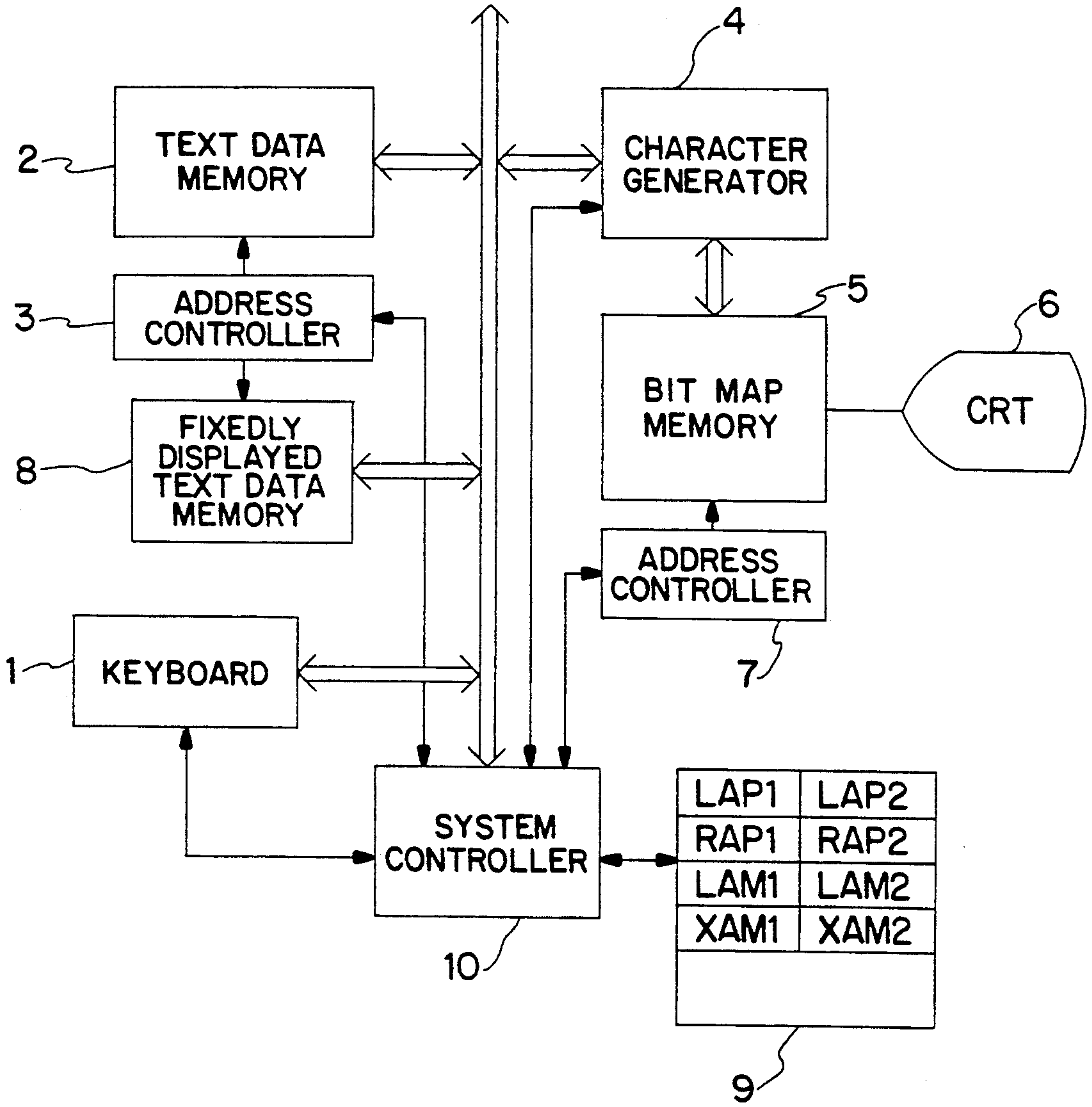
FIG. 1 is a block diagram of an embodiment of the text processing apparatus of the present invention.

FIG. 1 is a block diagram of the text processing apparatus of an embodiment of the present invention. The text processing apparatus includes a keyboard 1 having keys for inputting various text data and function keys for instructing edition, a text data memory 2 to store text data input with the keyboard 1 into the addresses designated by an address controller 3, a character generator 4 which converts the text data stored in the text data memory 2 into character bit data, a bit map memory 5 with a capacity for one screen which stores character bit data output from the character generator 4 into the addresses designated by an address controller 7, and a CRT 6 which raster scans and displays bit data stored in the bit map memory 5. It also includes a fixedly-displayed text data memory 8 which fetches from the text data memory 2 text data determined by the area specifying key on the keyboard 1 and stores it as a constantly displayed text data, and an edit control memory 9 which contains a first line address pointer (LAP1), a second line address pointer (LAP2), a first column address pointer (RAP1) and a second column address pointer (RAP2) which retain the area of text data to be displayed on the CRT 6 (the position for storing text data to be output to the character generator 2 from the text data memory 2) and a first line address memory (LAM1), a second line address memory (LAM2), a first column address memory (XAM1) and a second column address memory (XAM2) which store the addresses, in the text data memory 2, of the text data to be displayed fixedly. These data input/output control and edit/display control are all executed by a system controller 10. The memories 2 and 9 are, for instance, RAMs. The present embodiment uses a CRT as a display device. Although liquid crystal display device or EL (Electroluminescence) may be used instead of the CRT.

Text data input and display control in the above mentioned text processing apparatus are described in the following. Normally the text data is inputted by the keybord at a position of the cursor displayed on the CRT 6. The position information of the cursor is always supplied to the address controller 3 through the system controller 10 so that the corresponding address of the text data memory 2 is specified as an input address. Accordingly, when a character data is input from the keyboard 1, it is input to the text data memory 2 and stored into the address specified. When input of one character data has been complete, the cursor automatically moves to the next position. Thus repeating the above character input processing, text data is stored in the text data memory 2.

Next, the control system for displaying on the CRT the text data stored in the text data memory 2 is described. It is a matter of course that the above mentioned input control and the undermentioned display control are always processed parallel. The display capacity of the CRT is fixed to M lines×N columns (Ex. 8 lines×10 columns), and cannot display the whole input text data at once. Therefore, only the text data in the area displayable on the CRT6 (text data area) is output from the text data memory into the character generator 4. The bases to determine the text data area are the address pointers LAP1, LAP2, RAP1, and RAP2 in the edit control memory 9. The system controller 10 fetches necessary text data one by one character from the text data memory 2 and supplies it to the character generator 4 according to the address pointers. The character generator 4 converts the input character data into character bit data successively and outputs them to the bit map memory 5 so that they are displayed on the CRT through specified operations. The above-mentioned fetching of the necessary text data is repeated in a constant cycle in order to display text data input and updated in succession through the above mentioned input processing.

Figure 5:
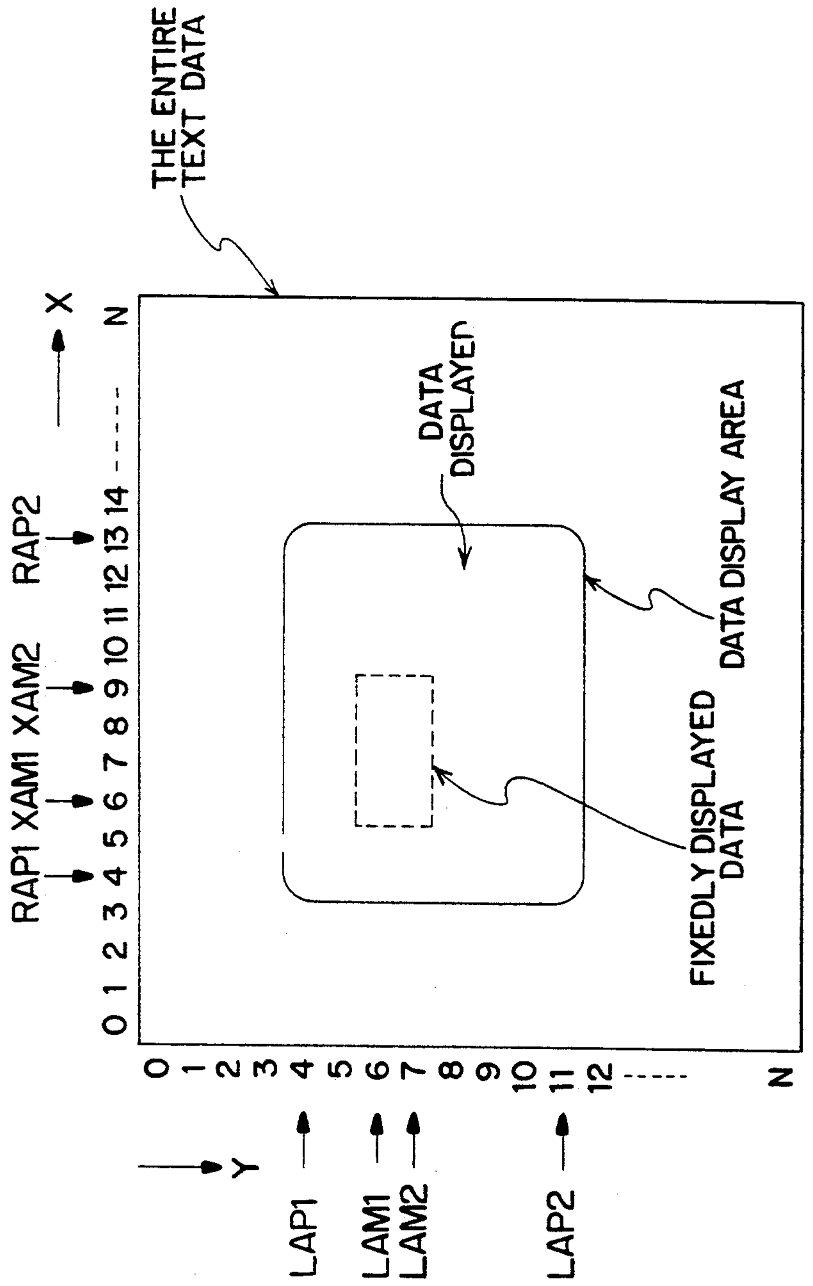
FIG. 5 shows the relation between a text data memory 2, a fixedly-displayed text data memory 8, and a display device 6 of the text processing apparatus of an embodiment of the present invention.

The address pointers LAP1, LAP2, RAP1, and RAP2 are described now with reference to FIG. 5.

The thick solid line in FIG. 5 indicates the text data physically which is presently stored in the text data memory 2, and the numbers on the X-axis of the text data memory 2 represent column addresses and those on the Y-axis line addresses. The thin solid line indicates text data area which can be displayed on the CRT. LAP1 holds the starting line address, LAP2 ending line address, RAP1 starting column address, and RAP2 ending column address of this area. Supposing that the CRT 6 has a display capacity of 8 lines×10 columns, the address difference between LAP1 and LAP2 is always "8", and that between RAP1 and RAP2 is always "10". The address data to be held by the address pointers are initially set to become LAP1:LAP2:RAP1-:RAP2=0:7:0:9, for instance, when text data is input initially. The address data of LAP1:LAP2:RAP1-:RAP2=4:11:4:13 as shown in FIG. 5 is the result of four upward scroll commands which add addresses for four lines to LAP1 and LAP2, and four leftward scroll commands which add addresses for four columns to RAP1 and RAP2. Referring to the address pointers LAP1, LAP2, RAP1, and RAP2 having the above mentioned characteristics, it is easy to calculate the text data area to be displayed on the CRT.

Figure 2:
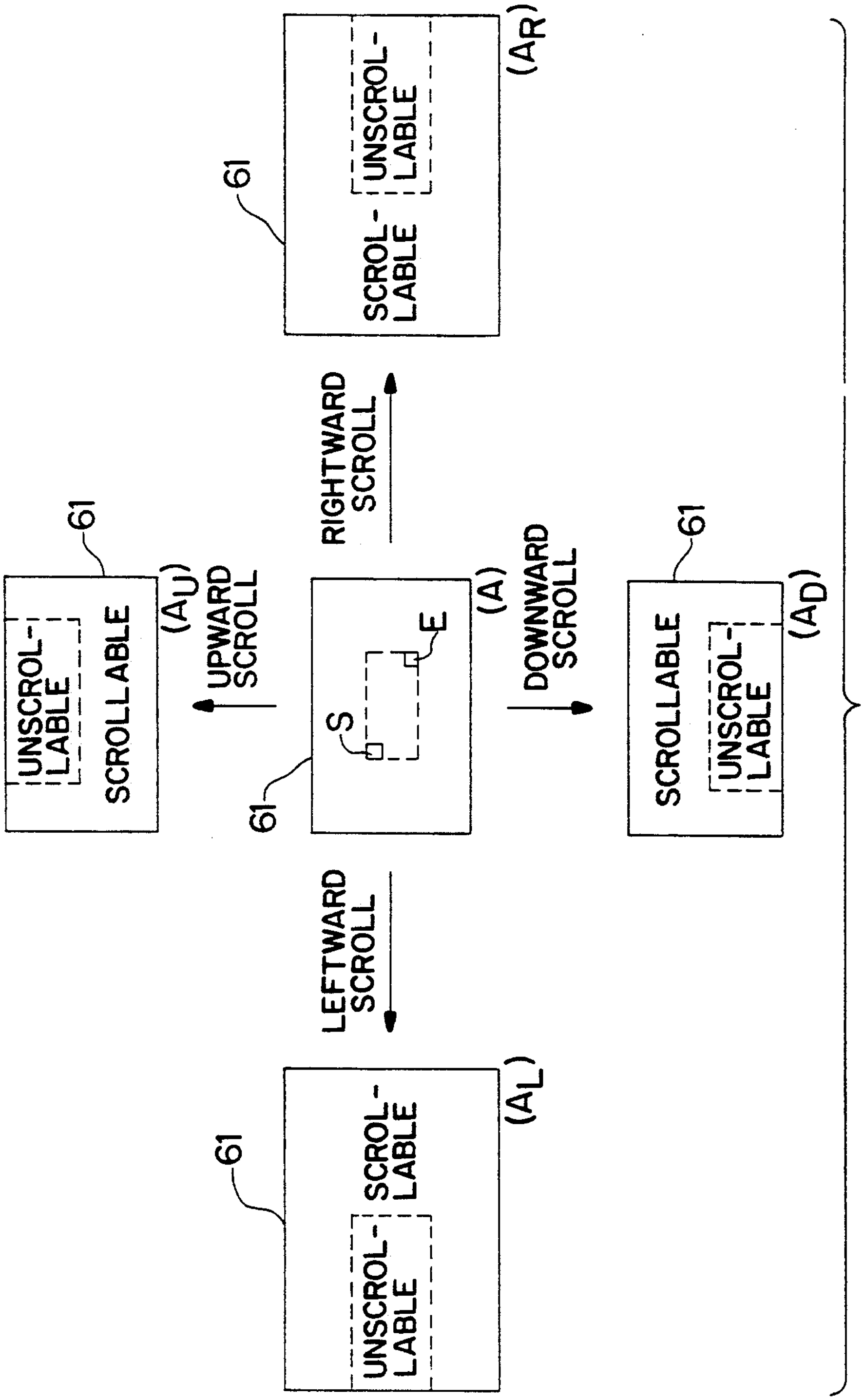
FIG. 2 shows a state of the screen of the text processing apparatus of the present invention.

FIG. 2 shows the principle of display scroll of the text processing apparatus related to the present invention. (A) shows a state of the screen 61 before scrolling. The region enclosed with a dotted line indicates the area specified with area specifying keys. (S) is a mark for indicating the area specification starting point, and (E) is a mark for indicating the area specification ending point. (AU) shows a state of the screen 61 in which the area specifying mark (S) has reached the upper end of the screen 61 by upward scrolling. (AD) shows a state of the screen 61 in which the area specifying mark (E) has reached the lower end of the screen 61 by downward scrolling. (AL) shows that the area specifying mark (S) has reached the left end of the screen 61 by leftward scrolling, and (AR) shows that the area specifying mark (E) has reached the right end of the screen 61 by rightward scrolling. In the present invention, the specified area where reference information has been input is scrolled until it has reached an end of the screen in the scrolling direction.

To produce a document, an operator inputs text information by using the keyboard 1. The information is stored in a specified area of the text data memory 2 and, at the same time displayed on the display device 6. Referring to the text information displayed, the operator presses a conversion key on the keyboard 1 if necessary to get desired character information, thereby storing a specified text information into the specified area in the text data memory 2. The above operation is repeated to produce a desired document.

If there is a text data which should be kept displayed for reference, the operator operates the area specifying keys on the keyboard 1. With this operation, the area specifying marks S and E appear on the screen 61 as shown in FIG. 2 (A), and the addresses of the text data memory 2 where the text data in this specified area is stored are stored in the address memories LAM1, LAM2, XAM1, and XAM2 in the edit control memory 9. At this time, the text data in the specified area is fetched from the text data memory 2 and stored into the fixedly-displayed text data memory 8.

The addresses stored in the above mentioned LAM1, LAM2, XAM1, and XAM2 will be understood with reference to FIG. 5. For example, LAM1 stores the address of the starting line of the text data in the area to be displayed fixedly, LAM2 stores the address of the ending line of the area, XAM1 stores the address of the starting column of the area, and XAM2 stores the address of the ending column of the area.

After the area specification for text data to be displayed fixedly is complete, and input of normal text data is resumed. In this process, when the input text data overflows the capacity of the display device or if an operator operates keys to move the cursor to the other area then currently displayed, the system controller 10 generates the predetermined scroll command. The system controller 10 operates in the procedures shown in FIG. 3.

Figure 3:
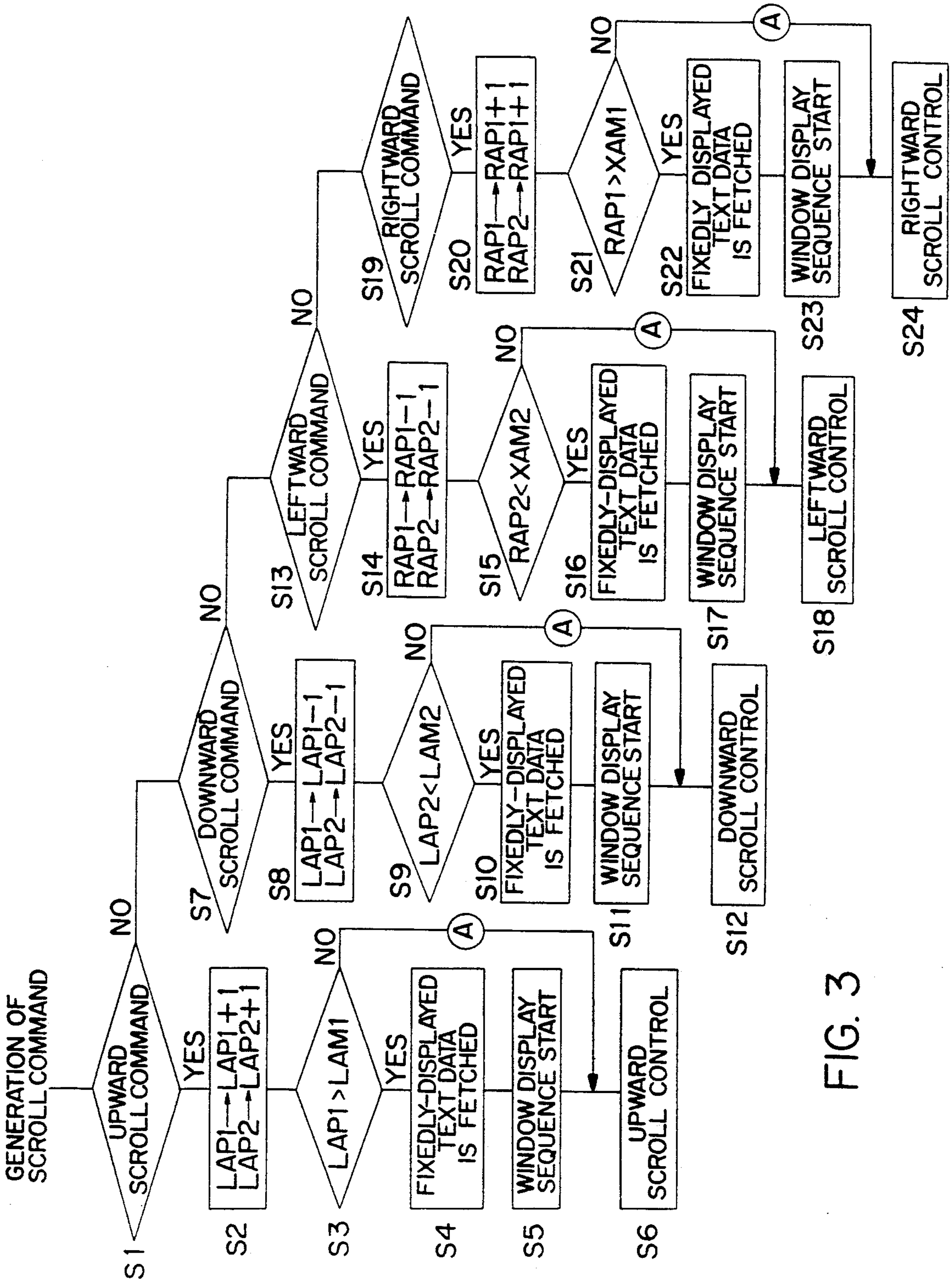
FIGS. 3 and 4 are flow charts showing an operation of the text processing apparatus of an embodiment of the present invention.

The operation of the system controller 10 is described with reference to FIG. 3.

If upward scroll command is generated, address pointers LAP1 and LAP2 which determine the data to be output for display increase for one address each, and the address data is compared between the address memory LAM1 and the address pointer LAP1 which has been processed for addition (steps S1, S2, and S3).

The above comparison between the address pointer LAP1 and the address memory LAM1 is executed to judge if the first line of the area-specified text data can be displayed or not. If the comparison result is LAP1≦LAM1, the system controller 10 refers to address pointers LAP1, LAP2, RAP1, and RAP2 to determine text data to be displayed, fetches the text data from the text data memory 2 and passes it to the character generator 4 to make a prescribed scroll operation (Steps S25 through S29). On the other hand, if the comparison result is LAP 1>LAM1, judging that all or a part of the area-specified text data disappears, the system controller 10 fetches the text data stored in the fixedly-displayed text data memory 8 and displays it in the multi-window screen in the place of or in the vicinity of the same text data which has been fetched from the text data memory 3 and displayed. Also, it refers to the address pointers LAP1, LAP2, RAP1, and RAP2 to determine the text data to be displayed, fetches the text data from the text data memory 3 to pass it to the character generator to execute a prescribed scroll operation (Steps S3 through S6). Thus, when the specified area has reached a specified position by scrolling, the text data to be displayed fixedly is displayed constantly in a multi-window screen.

The system controller 10 operates similarly for the downward, leftward, and rightward scroll commands and the address pointers execute addition or subtraction accordingly. If it is judged that the area-specified text data can not be displayed, the text data fetched from the fixedly-displayed text data memory is displayed in the multi-window, thus permitting the reference text data to be always displayed on the screen. (Refer to the steps S7 through S12 and S25 through S29 for the downward scroll command. Refer to the steps S13 through S18 and S25 through S29 for the leftward scroll command. Refer to the steps S19 through S24 and S25 through S29 for the rightward scroll command.)

The main points of these scroll commands are described.

With the downward scroll command, the system controller subtracts one address each from the address pointers LAP1 and LAP2, and compares the subtracted address pointer LAP2 and the address memory LAM2.

With the leftward scroll command, the system controller subtracts one address each from the address pointers RAP1 and RAP2, and compares the subtracted address pointer RAP2 and the address memory XAM2.

With the rightward scroll command, the system controller adds one address each to the address pointers RAP1 and RAP2, and compare the added address pointer RAP1 and the address memory XAM1.

Figure 4:
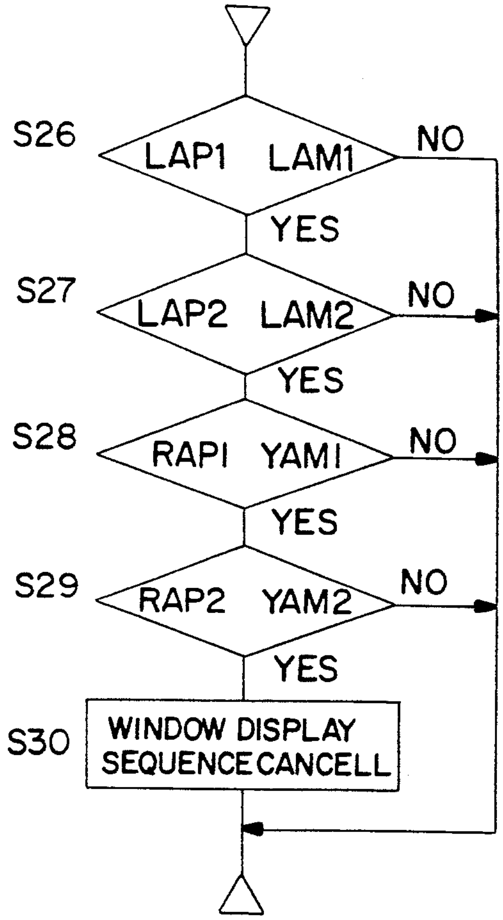

In the text processing apparatus of the present invention, when the comparison does not result in LAP1>LAM1, LAP2<LAM2, RAP2<RAM2, and RAP1>RAM1 in the steps S1, S7, S13, and S19, judgements as shown in FIG. 4 are executed.

As shown, this judgement judges if the address of the area-specified text data is included in the address of the text data displayed. In another word, it is judged if all the area-specified text data is included in the text data displayed. If it is included (all the conditions are satisfied in FIG. 4), multi-window display operation is cancelled.

According to the present invention, as mentioned above, the multi-window display operation is cancelled when the area-specified text data has been all displayed on the screen by the prescribed scroll operation realized by cursor operation by an operator. As a result the screen can be used more effectively. The area-specified text data is stored in both the fixedly-displayed text data memory 8 and the text data memory 2, so that the area-specified text data will not be fetched from the fixedly displayed text data memory 8 for fixed display in the multi-window screen when it is displayed on the basis of the text data memory 2.

According to the present invention, as explained above, if there is any information to be referred to, display area of the information is specified, so that, when the specified area has reached the upper, lower, left or right end of the screen in display scrolling, the information in the specified area is displayed fixedly at the end of the screen. Consequently, an operator can easily input text data, referring to the fixedly displayed text data, and therefore process text more efficiently.

While only certain embodiments of the present invention have been described, it will be apparent to those skilled in the art that various changes and modifications may be made therein without departing from the spirit and scope of the present invention as claimed.

What is claimed is:

1. An information processing apparatus which can display information in a scroll and fixed format comprising:

input means for inputting information;

display means including a screen which has boundary limits, responsive to the input means for displaying information in a scroll and fixed format;

area specifying means responsive to the input means, for specifying an area of information to be displayed on the screen in a window;

memories responsive to the input means to store information for editing;

scroll instruction means responsive to the input means for scrolling information;

control means responsive to the input means for displaying information defined by said area specifying means as a reference portion; and said control means including a window control means for displaying the information in the window in a fixed format, so that the information in the window and the window do not move relative to each other, when the window reaches the boundary limits of the screen and while other information on the screen outside of the window is being scrolled.

2. The information apparatus of claim 1, wherein the information is text and the limits of the screen are the upper, lower, right, and left extremities of the screen.

3. The information apparatus of claim 1, wherein the information in the window is displayed in lines and columns.

4. The information apparatus of claim 3 wherein the information in lines and columns is information in an amount that is less than an amount of information input by the input means.

5. A method of processing text for display in a scroll and fixed format, comprising the steps of:

(a) providing a text;

(b) designating a specific portion of the text to be a reference portion;

(c) displaying a portion of the text on a screen;

(d) displaying the reference portion of the text in a window on the screen in a fixed format so that the portion of the text and the window do not move relative to each other;

(e) scrolling the text and the window containing the reference portion; and (f) automatically stopping the window containing the reference portion when the window reaches the limits of the screen so that the reference portion is displayed while the text outside the window continues to scroll.

* * * * *